United States Patent [19]

Matsumoto et al.

[11] 4,307,068

[45] Dec. 22, 1981

[54] METHOD AND APPARATUS FOR TREATING AN EXHAUST GAS

[75] Inventors: Kazuhiro Matsumoto; Toru Seto; Takeji Tanaka, all of Hiroshima, Japan

[73] Assignee: Mitsubishi Jukogyo Kabushiki Kaisha, Tokyo, Japan

[21] Appl. No.: 178,637

[22] Filed: Aug. 15, 1980

Related U.S. Application Data

[63] Continuation of Ser. No. 938,309, Aug. 29, 1978, abandoned.

[30] Foreign Application Priority Data

Aug. 31, 1977 [JP] Japan .................................. 52-103643

[51] Int. Cl.$^3$ .............................................. B01D 53/36
[52] U.S. Cl. ..................................... 423/239; 422/169; 422/180
[58] Field of Search ........................... 423/239 A, 351; 422/169, 180

[56] References Cited

U.S. PATENT DOCUMENTS

| | | | |
|---|---|---|---|
| 3,581,463 | 6/1971 | Roberts | 423/215.5 |
| 4,102,980 | 7/1978 | Sasaki et al. | 423/239 |
| 4,193,972 | 3/1980 | Pohlenz | 423/239 X |

FOREIGN PATENT DOCUMENTS 1210867 11/1970 United Kingdom ............ 423/213.2

OTHER PUBLICATIONS

"Chemical Engineering", Apr. 11, 1977, p. 86.

Primary Examiner—George O. Peters
Attorney, Agent, or Firm—Wenderoth, Lind & Ponack

[57] ABSTRACT

A method for treating an exhaust gas containing nitrogen oxides, oxygen and soot, in which the nitrogen oxides are selectively reduced into nitrogen by adding ammonia to the exhaust gas as a reducing agent under existence of a catalyzer, is improved in that the nitrogen oxide is removed by introducing the exhaust gas into a denitration reactor in which a plurality of planar catalyzer packs or catalyzer packs having gas passage holes are arrayed in parallel to a gas flow and a linear velocity of the gas through the reactor is selected at 4–15 m/s. In one preferred mode of the method, soot having a relatively large particle diameter is preliminarily removed by a dust remover disposed upstream of the reactor, while most of the remaining soot is removed by a high performance dust collector disposed downstream of the reactor. Denitration reactor structures suitable for the improved method for treatment are also disclosed herein.

4 Claims, 33 Drawing Figures

METHOD AND APPARATUS FOR TREATING AN EXHAUST GAS

This application is a continuation of application Ser. No. 938,309, filed Aug. 29, 1978 now abandoned.

The present invention relates to a method and an apparatus for treating an exhaust gas containing nitrogen oxides (hereinafter called $NO_x$), oxygen and soot such as a heavy oil boiler exhaust gas, a sintering furnace exhaust gas, a coal boiler exhaust gas, etc.

Figure 1:
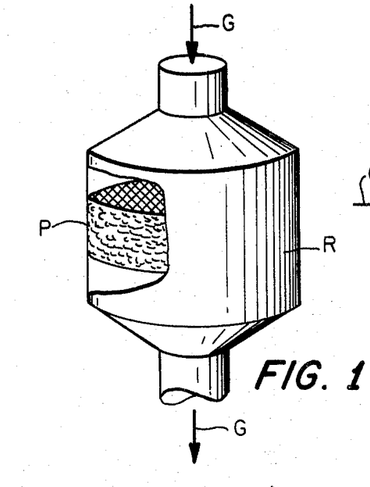
FIG. 1 is a schematic perspective view partly taken away of one example of a denitration reactor in the prior art.

In the heretofore known treating apparatuses of the above-referred exhaust gas, are mostly found the system in which a granular catalyzer of spherical or cylindrical shape is packed within a reactor R and a catalytic reaction is effected by introducing an exhaust gas G into the packed catalyzer layer P to pass the gas therethrough as shown in FIG. 1. A shortcoming of this system is that in case where solid particles such as soot are contained in a reaction gas, the soot will accumulate on the packed catalyzer layer P, resulting in blocking of the gas passageways, which raises a pressure loss of the exhaust gas within the reactor R and eventually makes the reactor inoperable. Also, it is a shortcoming that since the exhaust gas passes through the packed catalyzer layer P, the pressure loss of the exhaust gas within the reactor R is large.

Figure 2:
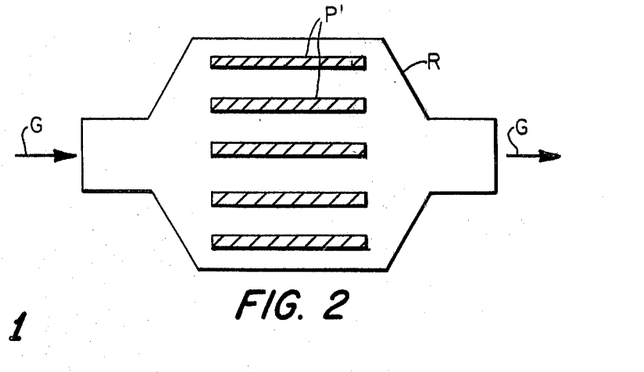
FIG. 2 is a schematic cross-section view of another example of a denitration reactor in the prior art.

In order to eliminate these shortcomings, recently a denitration reactor has been proposed in which planar packed layers P' of a granular catalyzer are disposed in multiple within a reactor R in parallel to a flow of an exhaust gas G as shown in FIG. 2. In addition, a honeycomb type catalyzer rather than a solid granular type has been also proposed. These are both of such type that a reaction gas flows in parallel to a contact surface, and have advantages that a pressure loss is small and that it is hardly influenced by soot. However, in the former type of catalyzer, if the interstices of the catalyzer grains should be blocked by the soot, then the same problem as that in the system shown in FIG. 1 would arise, while the latter type, that is, the honeycomb type of catalyzer had disadvantages that a manufacturing cost is high and there remain problems with respect to practical usefulness.

The present invention has been proposed with an object of improving the shortcomings of the above-described systems in the prior art; and by using planar catalyzer packs having spacers or protrusions or catalyzer packs having gas passage holes according to the present invention in the modes described hereunder, many advantage can be obtained in that blocking of a catalyzer layer caused by soot in an exhaust gas can be prevented, a contact area per unit volume of a catalyzer is increased, a contact efficiency with a gas is improved, accordingly the apparatus can be made compact, package formation of the apparatus is facilitated, and the apparatus is light in weight, strong in mechanical strength, and also easy in assembling.

These and other objects and advantages of the present invention will become more apparent by reference to the following description taken in conjunction with the accompanying drawings, in which:

Figure 3:
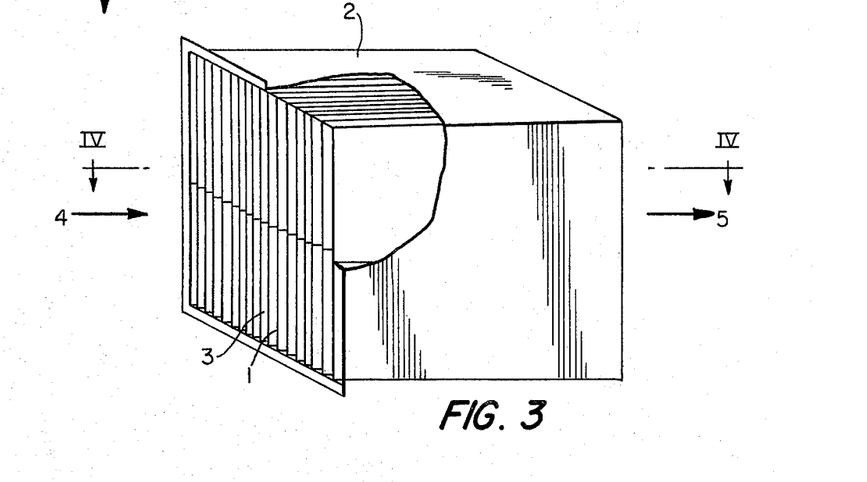
FIG. 3 is a schematic perspective view partly taken away of a denitration reactor according to the present invention which employs planar catalyzers.
Figure 4:
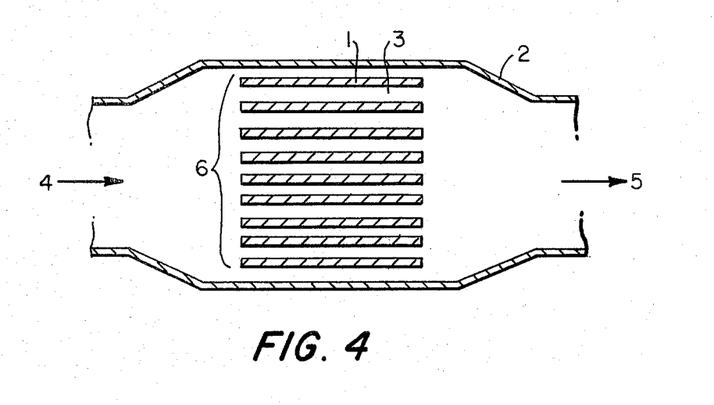
FIG. 4 is a schematic cross-section view taken along line IV—IV in FIG. 3.
Figure 5:
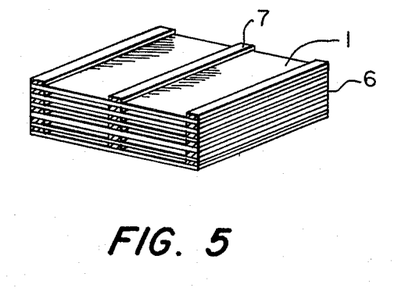
FIG. 5 is a perspective view showing a stack of planar catalyzers with spacers interposed therebetween.
Figure 6:
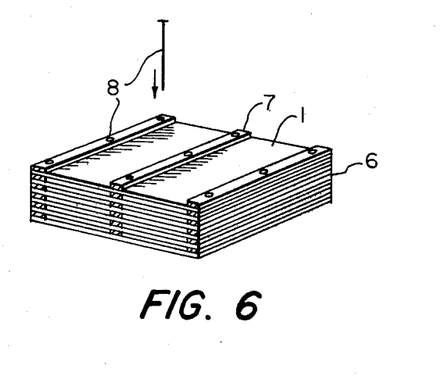
FIG. 6 is a perspective view showing a stack of planar catalyzers similar to FIG. 5 but jointly fixed in a different way.
Figure 7:
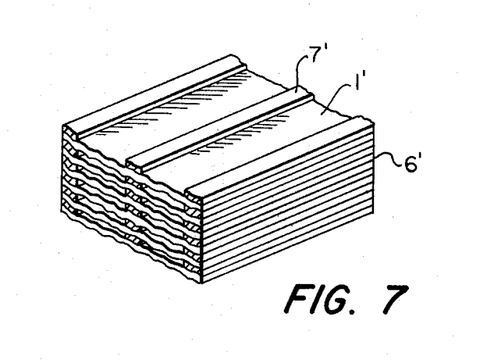
FIG. 7 is a perspective view showing a stack of corrugated catalyzer plates with cirrygated spacers interposed therebetween.

At first, the present invention will be described in connection to planar catalyzer packs associated with spacers, one example of which is illustrated in FIGS. 3 and 4. In these figures, reference numeral 1 designates planar catalyzers which are packed within a reactor 2 in a multi-layer arrangement maintaining a fixed interval therebetween to form a planar catalyzer group 6. Between the adjacent planar catalyzers in the planar catalyzer group 6 are formed exhaust gas flow passageways 3, so that an exhaust gas may enter the reactor 2 through an inlet 4 and may be discharged through an outlet 5. With regard to the method for forming the planar catalyzer group 6, for example, as shown in FIG. 5 at three positions between adjacent ones of a plurality of plates made of gypsum or calcium silicate having approximate dimensions of $1^m$ in length $\times 1^m$ in width $\times 1^{cm}$ in thickness are interposed spacers 7 made of the same material having approximate dimensions of $1^m$ in length $\times 5^{cm}$ in width $\times 5 \sim 30^{mm}$ in thickness, and these are fixedly secured together by means of a binder, or alternatively, a plurality of plates 1 could be fixedly secured into a block by means of nails as shown in FIG. 6. In addition, as shown in FIG. 7, in case where corrugated plates 1' are used, for the spacers also, spacers 7' curved in a corrugated shape are employed to form a corrugated plate group 6'.

Conversion of the thus formed block type plate group 6 or 6' into a catalyzer is effected by immersing the plate group in an aqueous solution containing one or more of reaction acitivators such as, for example, $VOSO_4$, $Fe_2(SO_4)_3$, $CuSO_4$, etc. until the amount of the reaction activator or activators impregnated in the plate group reaches about 10% in weight of the plate group 6 or 6', or else by applying onto the plate surfaces of the plate group 6 or 6' a slurry prepared by mixing 90% in weight of $TiO_2$ and 10% in weight of one or more of reaction activators such as $V_2O_5$, $MoO_7$, $WO_2$, etc. until the thickness of the applied slurry reaches about $0.1-1^{mm}$.

Figure 8:
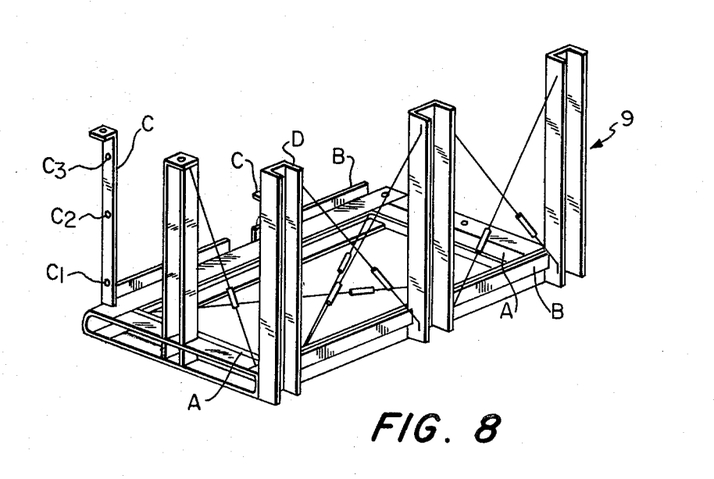
FIG. 8 is a perspective view of a lower frame section of a rectangular framework for packaging catalyzer plate blocks.

Now description will be made on a rectangular framework to be used upon packaging the block type plate group 6 or 6' which has been converted into a catalyzer in the above-described manner. FIG. 8 is a perspective view showing a structure of a lower section 9 of a rectangular framework manufactured mainly of iron channel bars and ion plates. In this figure, reference character A designates top-bottom steel plates (reinforcement steel plates), reference character B designates side steel plates, reference character C designates screw support steel plates, and the other members D are all made of steel channel bars. The screw support steel plate C in the lower section 9 is threaded with female screws $C_1$, $C_2$ and $C_3$ at a number of positions (at three positions in the illustrated embodiment), and this screw support plate is fixedly secured to steel plates A and B as by welding.

Figure 9:
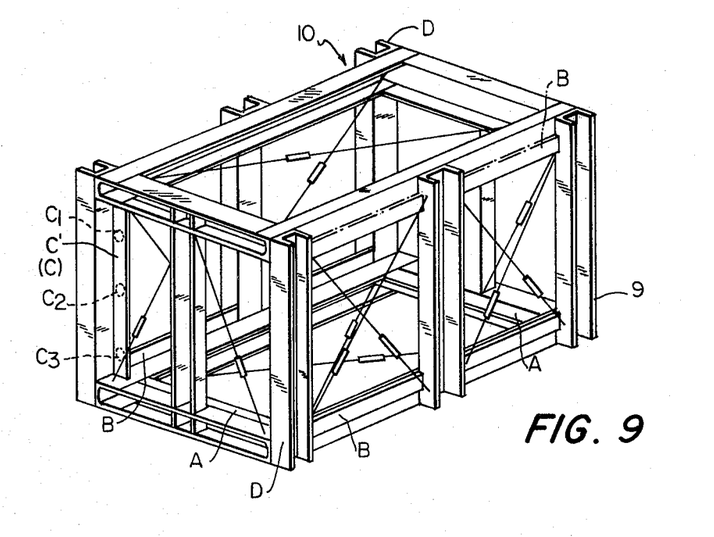
FIG. 9 is a perspective view of an assembled rectangular framework including the lower frame section in FIG. 8.

FIG. 9 shows a structure of a rectangular framework, in which an upper section 10 having exactly the same construction as the lower section 9 shown in FIG. 8 except for that in place of the screw support steel plates C, steel plates C' not threaded with female screws are provided, is assembled with a lower section 9 by means of bolts.

Figure 10:
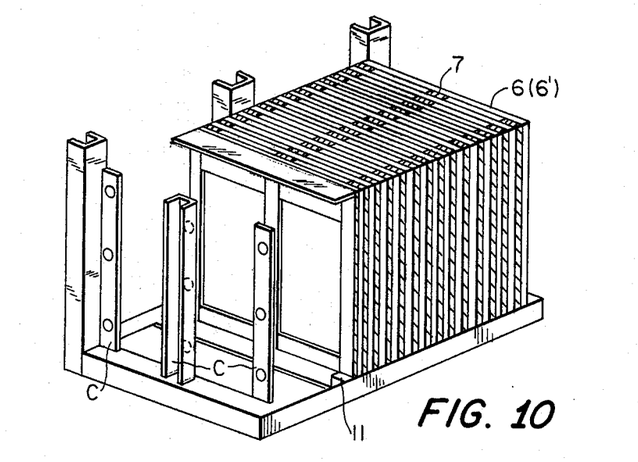
FIG. 10 is a perspective view showing a method for assembling catalyzer plate blocks in a rectangular framework.
Figure 11:
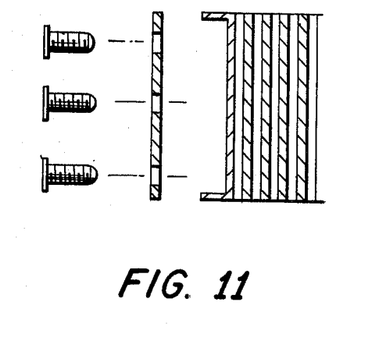
FIG. 11 is a schematic cross-section view showing a method for fixing catalyzer plate blocks assembled in a rectangular framework.

Upon assembling a plurality of block type plate groups 6 or 6' described above in such a rectangular framework to form a package, as shown in FIG. 10, the aforementioned block type plate group catalyzers 6 are successively arrayed on the lower section 9 of the rectangular framework in multiple, for example, 7-10 in number starting from the side opposite to the side of the screw support steel plates C, a pressure plate 11 is interposed at the terminal end of the array, thereafter the aforementioned upper section 10 of the rectangular framework is assembled as by fastening with bolts, and then as shown in FIG. 11, the packaging is effected by fixing the aforementioned pressure plate 11 with screws 12 of, for instance, $10-25^{cm}$ in length threaded through the above-described screw support steel plates C.

The above-described planar catalyzer packs associated with spacers have the following structural advantages:

(i) Packaging of the planar catalyzers is possible.

(ii) By varying the thickness of the spacers, the interval between the adjacent plates in the block type plate group catalyzer can be easily adjusted.

(iii) Since the plate group is integrated by means of spacers, the mechanical strength of the assembly is improved.

(iv) The rectangular framework for packaging the block type plate group catalyzer is easily in assembling, light in weight, rigid in mechanical strength and ready to contact with an exhaust gas.

(v) Since the assembly is a rectangular package of planar catalyzers, it can be stacked in the vertical and horizontal directions, and so, an exhaust gas treatment at an increased rate is possible.

(vi) Since the planar catalyzers are fixed with screws via a pressure plate, any arbitrary amount of planar catalyzers can be protected against vibrations and thermal strains, and transportation of the catalyzers is also easy.

(vii) Replacement of the planar catalyzers is easy.

(viii) The block type plate groups can be converted into a catalyzer while being maintained in the integrated state.

Figure 12:
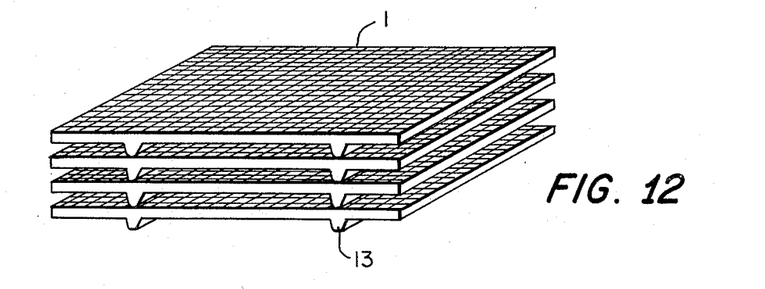
FIG. 12 is a perspective view showing a stack of planar catalyzers each having protrusions.
Figure 13:
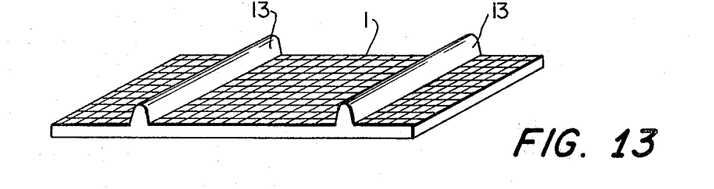
FIG. 13 is a perspective view showing the protrusion side of the planar catalyzer having protrusions in FIG. 12.
Figure 14:
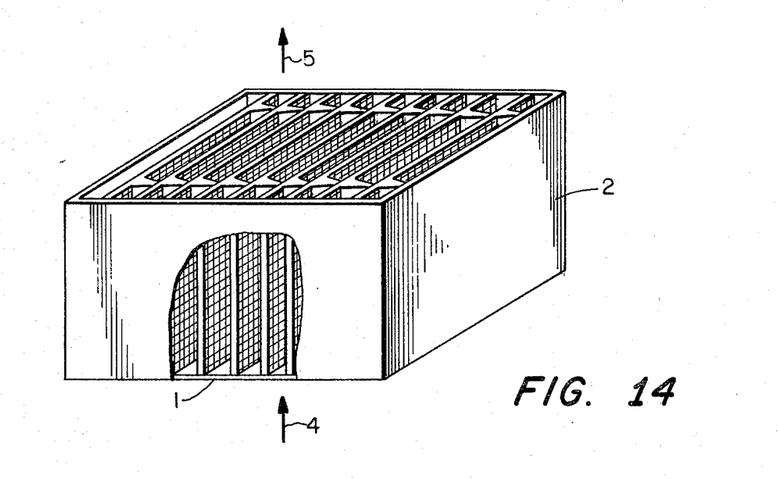
FIG. 14 is a perspective view showing a packaged group of planar catalyzers having protrusions.
Figure 15:
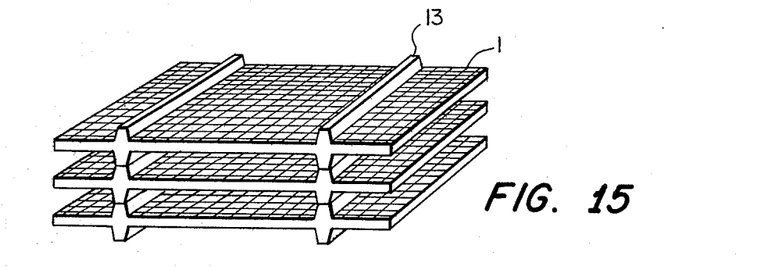
FIG. 15 is a perspective view showing a stack of planar catalyzers each having protrusions on its both sides.
Figure 16:
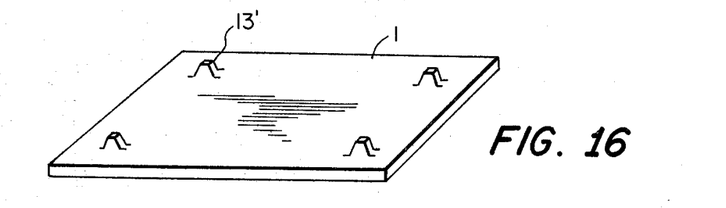
FIG. 16 is a perspective view showing a planar catalyzer having isolated protrusions on its one side.
Figure 17:
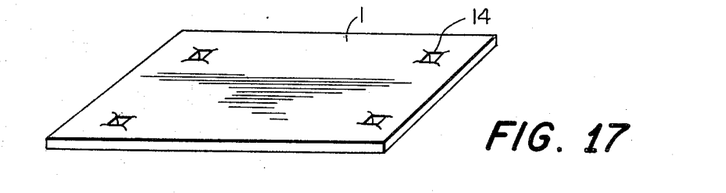
FIG. 17 is a perspective view showing the other side of the planar catalyzer in FIG. 16, FIGS. 18, 19 and 20 are perspective views showing further modifications of the planar catalyzers having protrusions.
Figure 18:
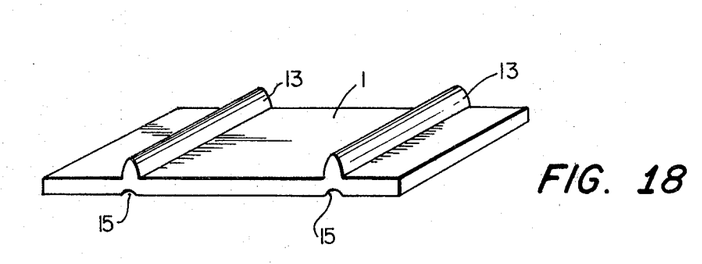
Figure 19:
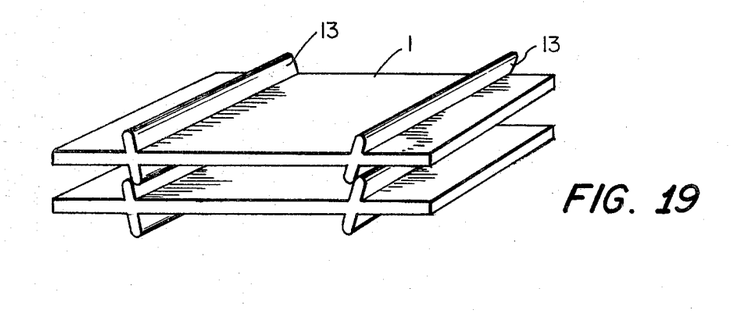
Figure 20:
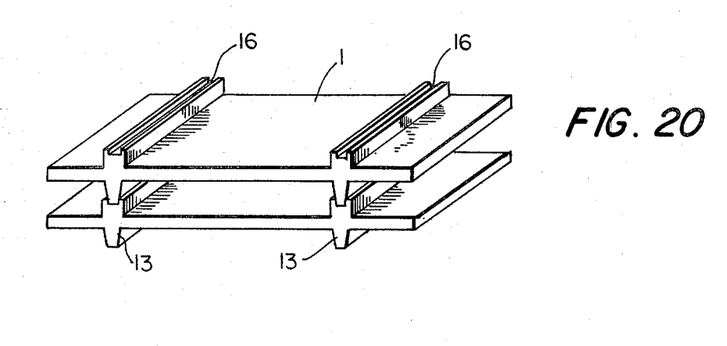

Next, description will be made on planar catalyzer packs having protrusions. This is based on the technique that a plurality of hardened bodies principally made of gypsum and calcium silicate, shaped in a planar form and each having a plurality of protrusions provided at least on one surface thereof as spaced apart from each other, are stacked in parallel to each other with the surface having the protrusions directed in the same direction, and an exhaust gas flow passageway is arranged in such manner that an exhaust gas may flow through the gap spaces between the hardened bodies which are formed by said protrusions. FIG. 12 is a perspective view showing four planar catalyzers 1 having protrusions 13 as stacked on each other, FIG. 13 shows the same planar catalyzer with the protrusions 13 directed upwards, and the height of the protrusions 13 is appropriately determined depending upon the operating condition of the reactor, but normally a height of 10-50 mm is selected. It is to be noted that the effective surface area of the planar catalyzer 1 can be increased by shaping its surface into a rough surface having many protrusions and recesses as shown in FIGS. 12 and 13. FIG. 14 is a perspective view of planar catalyzers 1 in a packaged state, in which reference numeral 2 designates a reactor, numeral 4 designates an exhaust gas inlet, and numeral 5 designates an exhaust gas outlet. FIGS. 15, 16 and 17 are perspective views of planar catalyzers 1 having elongated protrusions 13 on their both surfaces, a planar catalyzer 1 having isolated protrusions 13', and the back surface of the same, respectively. The recesses 14 in FIG. 17 are recesses adapted to receive the isolated protrusions 13' of the adjacent planar catalyzer 1 upon packaging. FIG. 18 shows one modification of the planar catalyzer 1, in which for the purpose of preventing displacement of the planar catalyzer 1, a groove 15 is provided on the back surface of the protrusion 13. FIG. 19 shows another modification of the planar catalyzer 1 in which the protrusions 13 are angled with respect to the vertical direction, and upon packaging, these planar catalyzers 1 are assembled as shown in this figure. FIG. 20 shows still another modification of the planar catalyzer 1 having protrusions 13 on its both surface as shown in FIG. 15, in which a groove 16 is provided on the top surface of the protrusion on one surface.

The above-described protrusions of various configurations serve as spacers upon packaging the planar catalyzers, are useful for preventing relative displacement of the respective plates, and also are effective for preventing strain of the hardened bodies in the manufacturing process.

The above-described respective planar catalyzers 1 are formed by mixing hydraulic granular material principally consisting of gypsum and calcium silicate and an activator content, pouring the mixture into a mould and hardening the same. As the hydraulic granular material, hemihydrate gypsum or anhydrite is used singly, or a mixed granular material of gypsum and cement, or a mixture of gypsum hemihydrate, titanium oxide and calcium silicate is used. As the activator content, oxides or sulfates of vanadium, molybdenum, tungsten, iron, chromium, copper, etc. are used either singly or in combination, and the method for activation is the same as the method employed in the case of the above-described planar catalyzer packs associated with spacers.

Now description will be made on a catalyzer pack having gas passage holes. This type of catalyzer pack is principally made of gypsum and calcium silicate, formed in a rectangular shape, and has many holes penetrated through its opposed surfaces either in the vertical direction or in the horizontal direction. This catalyzer pack has a large surface area per unit volume, is rigid in mechanical strength, and is easy in handling because when a plurality of packs are assembled as packaged into units it is only necessary to regularly stack the catalyzer packs.

FIGS. 21 through 27 are perspective views showing different embodiments, and in every figure, an arrow indicate a direction of an exhaust gas flow, and reference numeral 17 designates a catalyzer pack.

Figure 21:
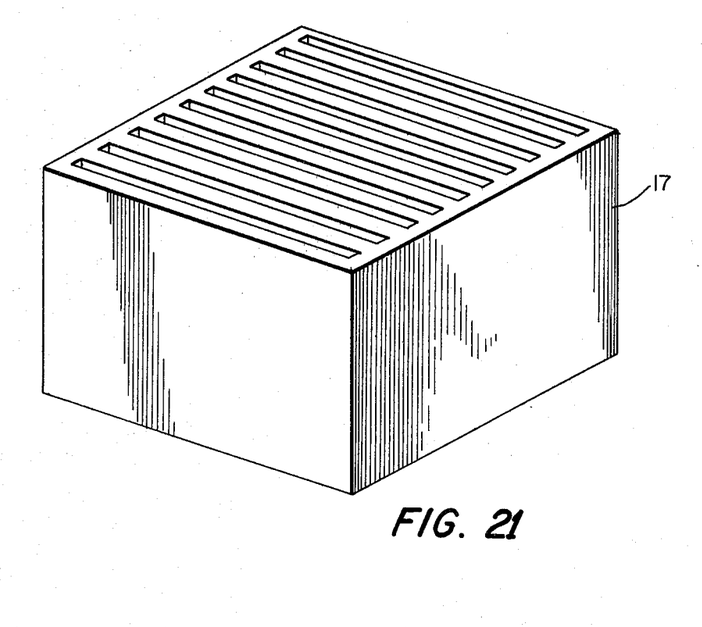
FIG. 21 is a perspective view showing a rectangular catalyzer block of slitted type.

In FIG. 21, gas passage holes of slit-like shape are penetrated, and for instance, in a rectangular body of $500^{mm} \times 500^{mm} \times 300^{mm}$ (length×width×height) are longitudinally provided 25 rectangular holes of $20^{mm} \times 460^{mm}$ in cross-section. In the illustrated example, the wall thickness inside of the catalyzer is $5^{mm}$, while the wall thickness along the outer periphery is $10^{mm}$.

Figure 22:
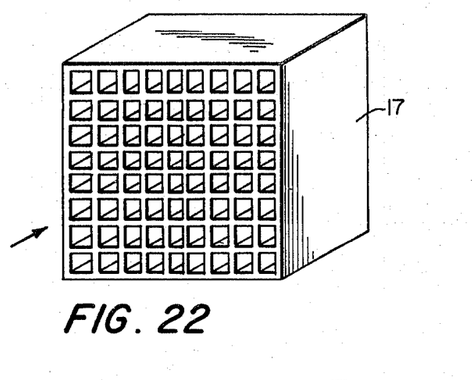
FIGS. 22, 23 and 24 are perspective views showing different types of rectangular catalyzer blocks having square gas passage holes.
Figure 23:
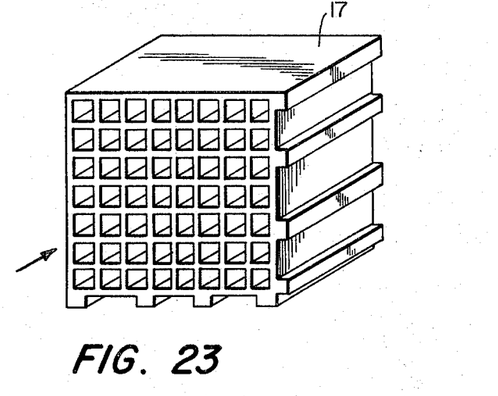
Figure 24:
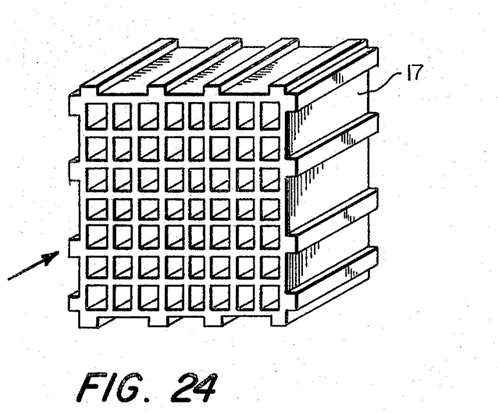
Figure 25:
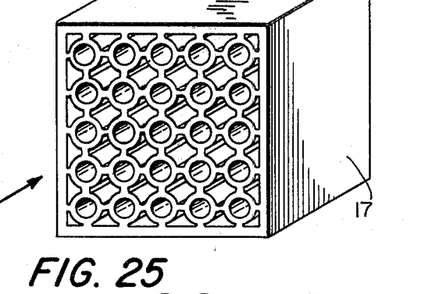
FIGS. 25, 26 and 27 are perspective views showing different types of rectangular catalyzer blocks having tubular gas passage holes.
Figure 26:
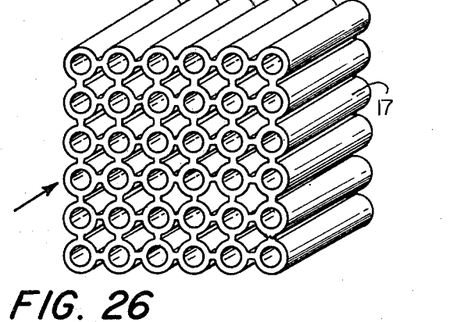
Figure 27:
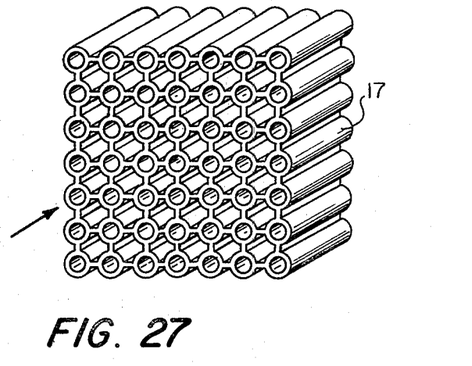

FIG. 22 shows a pack having square passage holes which has its mechanical strength greatly improved, while FIGS. 23 and 24, respectively, show catalyzer packs having protrusions formed on a part or whole of their side surfaces, which are useful for increasing a contact surface area for a gas when a plurality of such catalyzer packs are stacked on each other. FIGS. 25 to 27 show examples of catalyzer packs having tubular gas passage holes penetrated therethrough, in which though a manufacturing cost is somewhat raised, a contact surface area per unit volume can be further enhanced.

Figures 28, 29, 30, 33:
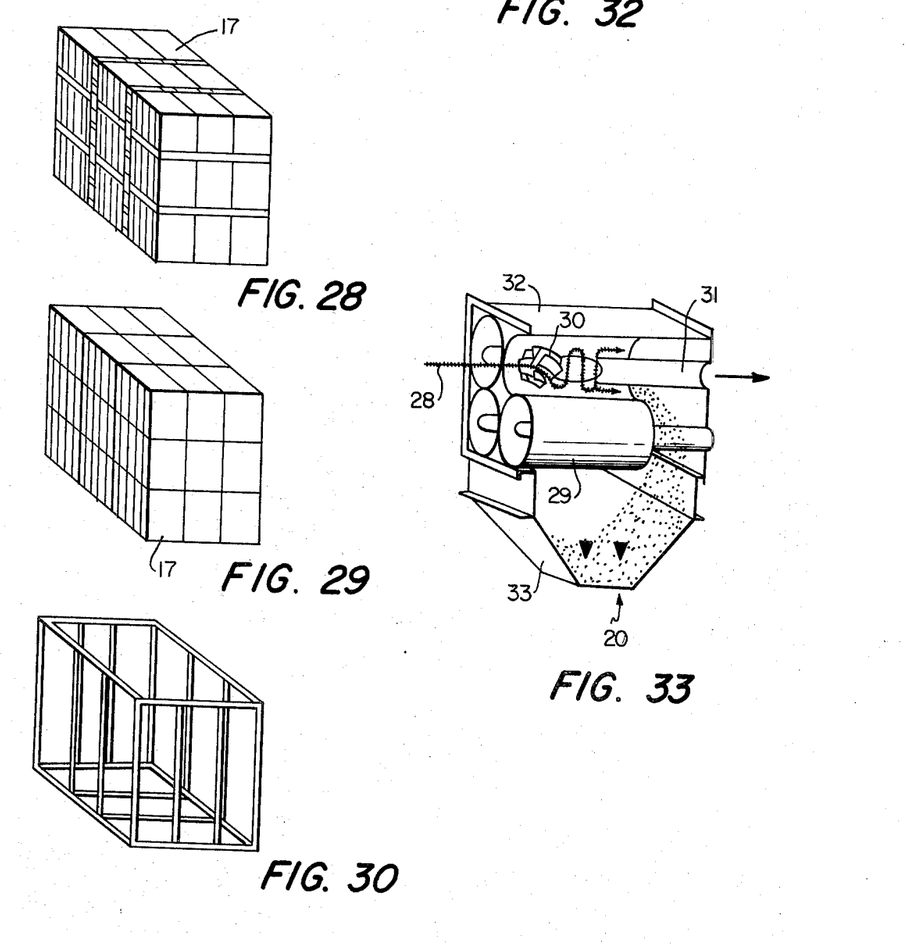
FIGS. 28 and 29 are schematic perspective views showing a method for assembling the rectangular catalyzer blocks having gas passage holes.
FIG. 30 is a schematic perspective view showing an iron frame for fixedly packaging the assembled rectangular catalyzer blocks.
FIG. 33 is a perspective view partly taken away of a dust remover of simple type that is suitable for use in the method and apparatus according to the present invention.

When these packs 17 are assembled into a catalyzer layer, it is only necessary to stack them on each other in the longitudinal, lateral and vertical directions with the directions of the holes aligned in a fixed direction as shown in FIGS. 28 and 29, and to fix them with, for example, an iron frame shown in FIG. 30 for packaging the same, and thereby transportation, assembling in an apparatus and removal of the catalyzer layer become easier. It is to be noted that the method for activation is the same as the method employed in the case of the above-described planar catalyzer packs associated with spacers.

The planar catalyzers associated with spacers, planar catalyzers having protrusions and catalyzer packs having gas passage holes constructed in the above-described manner, have advantages that since soot flows jointly with a gas flow in parallel to a catalyzer surface, adhesion of the soot within the catalyzer layer scarcely occurs, adhered soot is resputtered by a lateral gas flow having a linear velocity of 4 m/s or higher, after all increase of the adhered soot with time will not occur, and thereby the capability of the catalyzer can be assured for a long period of operation.

In addition, another advantage is that the apparatus includes a few which causes a pressure loss such as collision, expansion, contraction and bending of a gas flow, so that a gas linear velocity permissible for the apparatus within the pressure loss range of about $40-200^{mm}$ in water head is about 4-15 m/s, which is fairly large with respect to the linear velocity of about 1 m/s in the case of the granular catalyzer in the prior art. Owing to such a high linear velocity, a blow-away effect for the soot is improved, and since the gas flow presents a tubulent flow, gas diffusion in a gaseous phase becomes more active and thereby a denitration rate can be improved. Also it becomes possible to additionally install the denitration reactor within an existing gas flue.

In the next, we will explain the denitration effect in the treating method according to the present invention, in connection to its preferred embodiments.

Figure 31:
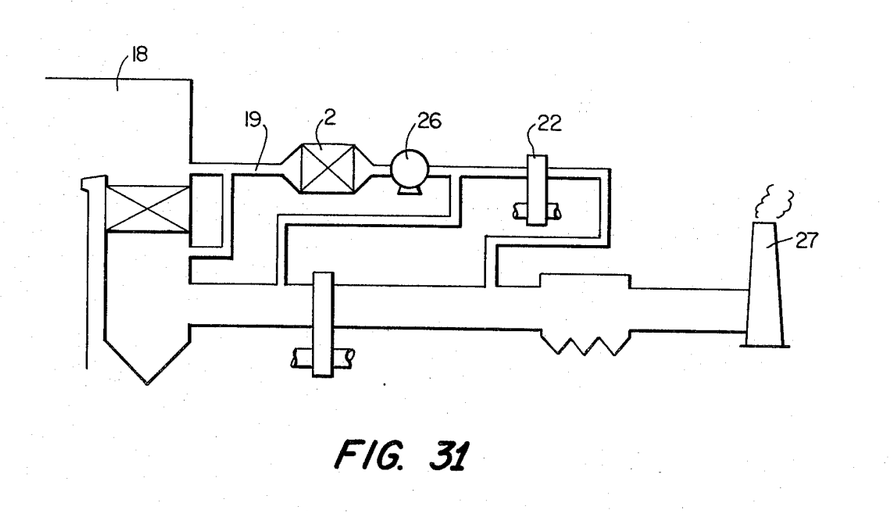
FIG. 31 is a schematic system diagram showing one preferred embodiment of the method for treating an exhaust gas according to the present invention as applied to a heavy oil boiler exhaust gas.

FIG. 31 shows one preferred embodiment of the treating method according to the present invention as applied to a heavy oil boiler exhaust gas. An exhaust gas discharged from a boilder 18 is led from the proximity of an economizer to a flue, where a part is branched for a pilot plant. In this branched flue, the exhaust gas is mixed with an $NH_3$ gas fed from an injection port 19 of an $NH_3$ gas for denitration reaction, and then it is led to a denitration reactor 2 where a denitration reaction is effected so that $NO_x$ may react with $NH_3$ to be converted into harmless nitrogen.

The denitration reactor used in this system has a construction as shown in FIGS. 3 and 4, and as the catalyzer, a planar catalyzer in which a vanadium compound is carried by calcium silicate. A linear velocity of a gas was 4.5 m/s, a temperature was 380° C., a soot concentration was about 0.02-0.03 $g/Nm^3$, an $NO_x$ concentration was 150-250 PPM, and an $NH_3$ concentration was 150-250 PPM. The denitrated exhaust gas is passed through a blower 26 and an air preheater 22 and exhausted from a stack 27 into the atmosphere as a clean gas.

As a result of a continuous operation over a long period of about 5000 hours, a denitration rate was maintained at 92-93% and no tendency of lowering was found. In addition, the pressure loss in the denitration reactor was kept at 35 mm in water head without change.

In case where a soot concentration is relatively low as is the case with a heavy oil boiler exhaust gas, a sintering furnace exhaust gas, or the like, a satisfactory result can be obtained with a denitration reactor employing the above-described catalyzer packs. However, in case where a soot concentration is high as is the case with a coal boilder exhaust gas, there arise disadvantages such as lowering of a catalyzer activity caused by adhesion of soot onto a catalyzer, and wear of a catalyzer caused by collision of soot onto a catalyzer surface when the soot passes through the catalyzer layer. Accordingly, as a solution for this problem it may be contemplated that the soot is removed by a high performance dust remover such as an electric dust collector prior to introduction of the exhaust gas into a catalyzer layer. However, since the electric dust collector is disposed at an outlet of an economizer in view of a reaction condition in the denitration reactor (for instance, a temperature of 300° C.–400° C. is desirable), the dust collector must be an apparatus having a very large capacity because the exhaust gas takes an increased volume due to thermal expansion, and therefore, the installation of the dust collector necessitates a large installation expense and a large site, and is thus less practical.

In view of the aforementioned circumstance, the inventors of this invention have conducted various experimental researches to develop a denitration reactor which has a relatively simple construction and yet can obtain an excellent denitration efficiency by achieving the catalyzer function over a long period, and as a result, have found it possible to achieve the above object by providing an appropriate simple type dust remover in combination with the denitration reactor consisting of planar catalyzers.

In connection to the aforementioned simple type dust remover, it was experimentally confirmed that the amount of wear of the catalyzer caused by collision of soot onto the catalyzer surface when the soot passes through the catalyzer layer is proportional to a particle diameter of soot, a soot concentration and a gas flow velocity, and among these especially the influence of the particle diameter of soot is very large, and therefore, as an effective method for preventing wear, it has been discovered that the wear of the catalyzer can be almost prevented by selectively removing only the part of soot having a larger particle diameter of 50–60$\mu$ or larger which generally occupies only about 5–10 weight % of the soot. Consequently, with regard to the dust remover, by means of a simple type dust remover which is useful for removing only larger diameter particles occupying a part of the soot in the exhaust gas, the above-mentioned object can be achieved, and accordingly, the system according to the present invention has the following advantages:

(a) The installation area is small, the system can be assembled outside of the existing duct, and an installation expense is small.

(b) The pressure loss is small, and so, a drive power expense can be reduced to a very small amount.

(c) The maintenance is simple and a maintenance expense is small.

Figure 32:
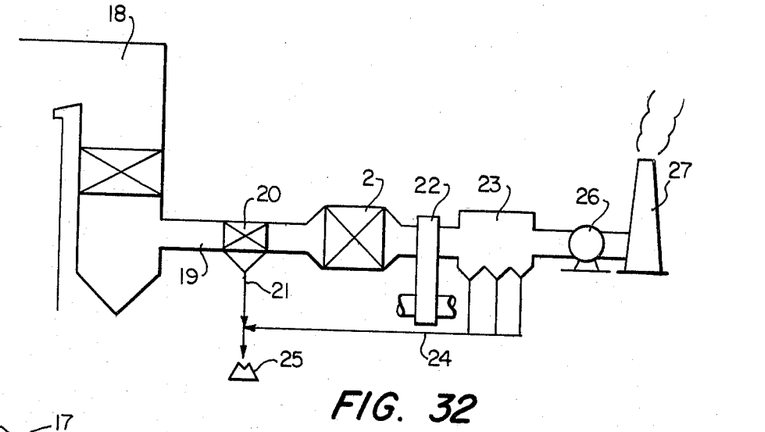
FIG. 32 is a schematic system diagram showing another preferred embodiment of the present invention as applied to a coal boiler exhaust gas.

Now the above-referred modified embodiment of the treating method according to the present invention will be described in greater detail with reference to FIG. 32. The treating system illustrated in FIG. 32 is one preferred embodiment of the present invention as applied to a coal boiler exhaust gas. An exhaust gas discharged from a boiler 18 is passed from an economizer outlet to a flue, is mixed with an NH$_3$ gas fed from an injection port 19 of an NH$_3$ gas for denitration reaction, and then is led to a simple type dust remover 20. In this dust remover, a part of the soot having a larger particle diameter is removed from the exhaust gas and is discharged through a discharge pipe 21 to the exterior of the system. Next, the exhaust gas is led to a denitration reactor 2 consisting of planar catalyzer packs associated with spacers or having protrusions, or catalyzer packs having gas passage holes, where a denitration reaction is effected so that NO$_x$ may react with NH$_3$ to be converted into harmless nitrogen. Soot accompanying with the exhaust gas would pass through the catalyzer layer without adhering and accumulating within the denitration reactor. The denitrated exhaust gas is led to an air preheater 22, and after a heat has been recovered in this preheater, it enters an electric dust collector 23 as a low temperature exhaust gas, where most of the remaining soot is removed. The collected soot is passed through a discharge pipe 24 and is collected as fry ash 25 together with the soot discharged from the simple type dust remover 20.

The exhaust gas discharged from the electric dust collector 23 is passed through a blower 26 and is discharged from a stack 27 into the atmosphere as a clean gas.

FIG. 33 shows one example of the simple type dust remover 20 to be used in the method and apparatus according to the present invention. As shown in this figure, an inlet exhaust gas 28 enters a gas introduction cylinder 29, where the exhaust gas is adapted to be given a swirl motion by guide blades 30. Owing to this swirl motion, the exhaust gas is led to a cylinder outlet while the soot is being separated from the gas flow by a centrifugal separation effect, and eventually the soot having a larger particle diameter is separated from the gas flow and collected in a dust collecting hopper 33. The exhaust gas containing the remaining soot is discharged from a gas outlet pipe 31 as an outlet exhaust gas, and is led to the denitration reactor 2. It is to be noted that in FIG. 33, reference numeral 32 designates a casing which forms an outer wall of the dust remover 20.

While an example of a dust remover 20 employing an axial-flow cyclone was illustrated and described above, the dust remover should not be limited to such type, but various kinds of simple type dust removers such as a settling system or a baffle plate system are applicable depending upon a distribution of soot particle diameters in the exhaust gas. However, according to our experiments, the results obtained when the exhaust gas was treated by means of a conventional cyclone in place of the axial-flow cyclone and under the condition that soot having particle diameters of 15–25$\mu$ or larger was removed the denitration reactor was operated, proved that adhesion of soot onto the planar catalyzers was increased on the contrary. Accordingly, with regard to the particle diameters of the soot to be removed, it has been found that there is a proper value for the particle diameters, and that if soot having larger particle diameters is left as much as possible within the range where the wear problem would not occur, taking the wearing capability of the soot and the gas velocity into consideration, then the remaining larger diameter particles are effective for preventing adhesion of the soot owing to the blow-away effect of the larger diameter particles.

Next, description will be made on one example of the denitration effect obtained by the above-described embodiment of the treating method according to the present invention. The denitration reactor employed in this embodiment had the construction shown in FIGS. 3 and 4, and as the catalyzer, planar catalyzers consisting of a vanadium compound carried on calcium silicate plates were used. The gas linear velocity was selected at 6 m/s, the temperature was selected at 360° C., $NH_3$ was added to the exhaust gas at the economizer outlet of the coal boilder, and then the mixture was introduced to a reactor.

A soot concentration was about 5–12 $g/Nm^3$, an average soot particle diameter was about 20$\mu$, and $NO_x$ concentration was 200–250 PPM, and an $NH_3$ concentration was 200–250 PPM.

At first, when the system was continuously operated over a long period of 1000 hours without employing a dust remover, the resultant denitration rate was about 95%, but as time elapses, lowering of the denitration rate was observed. In addition, a pressure loss in the denitration reactor which was initially equal to 40 mm in water head, was also somewhat lowered.

As a result of opened inspection, adhesion of soot onto the planar catalyzers was not acknowledged, but wear of the catalyzer surfaces was observed.

Nextly, soot having particle diameters of 50–60$\mu$ or larger was preliminarily removed by means of an axial-flow cyclone illustrated in FIG. 33 which was interposed in front of the denitration reactor 2. A soot concentration at the outlet of the dust remover was about 4–10 $g/Nm^3$, a dust removing efficiency as about 15%, and a pressure loss was equal to about 25 mm in water head.

Likewise, when the system was continuously operated over a long period of 1000 hours, as a result an outlet $NO_x$ concentration of 10–15 PPM could be always assured. In addition, with regard to a pressure loss in the denitration reactor, it was equal to about 40 mm in water head, and its change with time could not be found.

As a result of opened inspection, wear of the catalyzers as well as adhesion and accumulation of soot were not observed. Next, the results obtained when the exhaust gas was treated by means of a conventional cyclone in place of the axial-flow cyclone and under the condition that soot having particle diameters of 15–25$\mu$ or larger was removed the reactor was operated continuously over the same period, proved that a tendency of the soot adhering was observed on the contrary. As a result, it was found that in the illustrated embodiment the best results were obtained when the soot particles having diameters of 50–60$\mu$ or larger were removed.

As will be apparent from the above description, the method and apparatus for treating an exhaust gas according to the present invention do not necessitate a large-sized dust collector as employed in the prior art, but can assure an excellent denitration efficiency stably over a long period by employing a dust remover having a relatively simple structure and a denitration reactor formed by packaging planar catalyzers, and therefore, the present invention is practically very useful.

What is claimed is:

1. In a method for treating a coal boiler exhaust gas containing nitrogen oxides, oxygen and soot, in which the nitrogen oxides are selectively reduced into nitrogen by adding ammonia to the exhaust gas as a reducing agent under the existence of a catalyzer; the improvement which comprises first removing soot having a particle size of 50$\mu$ in diameter and larger by passing coal boiler exhaust gas through an axial-flow cyclone dust remover, introducing the gas into the denitration reactor to remove the nitrogen oxides by passing the gas through parallel passage ways through a denitration reactor at a linear velocity of 4–15 m/s, said denitration reactor being made up of a plurality of planar catalyzer packs or catalyzer packs having gas passage holes arranged in parallel to the gas flow and then removing the remaining soot by passing the gas through a dust collector to remove dust or soot of a particle size smaller than 50$\mu$ at the downstream of said denitration reactor.

2. A method according to claim 1 in which said catalyzer packs are made of a hydraulic material composed primarily of a molded and hardened material of a hydraulic granular composed principally of a mixture of gypsum and calcium content containing the catalyst intimately mixed with the hydraulic material.

3. A method according to claim 2 wherein the hydraulic granular material used to form the catalyst planar packs are made of a mixture of gypsum and cement.

4. A method according to claim 2 in which the active catalyst intimately mixed with the hydraulic material is an oxide or a sulfate of a metal selected from the group consisting of vanadium, molybdenum, tungsten, iron, chromium and copper.

* * * * *